United States Patent
Furukawa

[11] Patent Number: 5,934,701
[45] Date of Patent: Aug. 10, 1999

[54] AUTOMOBILE AIR BAG

[76] Inventor: Keiji Furukawa, 5-banchi, Hououcho, 2-chome, Chigusa-Ku, Nagoya, Japan

[21] Appl. No.: 08/925,776

[22] Filed: Sep. 9, 1997

[30] Foreign Application Priority Data

Sep. 12, 1996 [JP] Japan ............................ 009986/1996 U

[51] Int. Cl.$^6$ .................................................. B62D 21/08
[52] U.S. Cl. ........................................ 280/730.1; 280/729
[58] Field of Search .................................. 280/730.1, 729, 280/728.1, 738, 743.1

[56] References Cited

U.S. PATENT DOCUMENTS

| | | | |
|---|---|---|---|
| 4,265,468 | 5/1981 | Saszko et al. | 280/729 |
| 5,435,594 | 7/1995 | Gille | 280/728.2 |
| 5,486,019 | 1/1996 | Chevroulet et al. | 280/730.1 |
| 5,558,300 | 9/1996 | Kalberer et al. | 244/121 |
| 5,575,497 | 11/1996 | Suyama et al. | 280/730.1 |

FOREIGN PATENT DOCUMENTS

| | | | |
|---|---|---|---|
| 2303951 | 12/1990 | Japan . | |
| 2528258 | 12/1990 | Japan . | |
| 4110252 | 4/1992 | Japan | 280/730.1 |
| 7329688 | 12/1995 | Japan . | |

*Primary Examiner*—Christopher P. Ellis
*Attorney, Agent, or Firm*—Dickstein Shapiro Morin & Oshinsky LLP

[57] ABSTRACT

To provide a novel air bag which rapidly expands at an occurrence of an accident so as to protect a driver and the like and is intended to protect against a leftward-and-rightward impact as well as a frontal impact. An automobile air bag is characterized by that bank portions 1a, 1a are formed at both the sides of an air bag body 1 so that a head of a human body may be wrapped forward and leftward-and-rightward.

1 Claim, 4 Drawing Sheets

AUTOMOBILE AIR BAG

BACKGROUND OF THE INVENTION (i) Field of the Invention

The present invention relates to an air bag which rapidly expands at an occurrence of an accident so as to protect a driver and the like.

(ii) Description of the Prior Art

A conventional air bag has been a spherical balloon, a circular cushion or the like in shape so as to deal with a frontal impact.

An automobile accident is not always so simple that a just frontal impact is given. That is, some accidents are so simple that an automobile once collides with something and then stops. Otherwise, the automobile collides on its left front and turns over, resulting in a crash of a right front and a right side. The automobile crashes head-on and is then struck from diagonally behind, which causes the automobile to turn over and lie on its side. Due to the accident upon meeting suddenly, the automobile crashes on its right side, and the resultant impact causes the automobile to crash against a utility pole on its left side. Various cases such as these combined accidents occur.

In the combined accident as described above, a body and a head of a driver and the like are shaken backward-and-forward and rightward-and-leftward many times. They are further shaken upward and downward many times. In addition, the crash results in little original form of a space such as a driver's seat. In some cases, the space is deformed so that it is substantially half or less.

By the way, since the conventional air bag has been the spherical balloon or the circular cushion in shape, it is suitable for the frontal impact. However, the conventional air bag is almost helpless against the impact at both of the right and left sides. Accordingly, although the air bag is operated, the driver and a passenger cannot be protected, thereby resulting in a direct connection with a serious accident in many cases.

SUMMARY OF THE INVENTION

The present invention is intended to provide a novel automobile air bag in which such a conventional problems is solved.

According to a first aspect of the present invention, an automobile air bag is characterized by that bank portions 1a, 1a are formed at both the sides of an air bag body 1 so that a head of a human body may be wrapped forward and leftward-and-rightward.

According to a second aspect of the present invention, an automobile air bag is characterized by that bank portions 10a, 10a are formed at both the sides of an air bag body 10 so that the head of the human body may be wrapped forward and leftward-and-rightward, an auxiliary air bag 11 is disposed between the bank portions 10a, 10a of the air bag body 10, both the air bags are so independently disposed that their respective blowing ports and discharge ports for an expanding gas follow individual routes, whereby, after a completion of a gas discharge from the auxiliary air bag 11, the gas is discharged from the air bag body 10.

In accordance with an adoption of the above-described construction, at an occurrence of an accident, an upper half part of the human body, more specifically, the head is protected from a leftward-and-rightward impact as well as a frontal impact. In such a manner, a conventional problem described above is solved.

In case of the first aspect of the present invention, an existence of the bank portions 1a, 1a prevents the frontal impact and either-side impact against the human body at the same time. At the occurrence of a secondary accident, a protective effect is achieved as it is.

In case of the second aspect of the present invention, at the occurrence of a primary accident, an expansion of the air bag body 10 and the auxiliary air bag 11 allows the upper half part of the human body, more specifically, the head to be protected from the leftward-and-rightward impact as well as the frontal impact. After the occurrence of the primary accident, the gas in the auxiliary air bag 11 is degassed prior to a degassing of the air bag body 10. Thus, a pressure on the head, more specifically, a face is released. Accordingly, an appropriate judgment and treatment of a choking sensation caused by the pressure and of the secondary accident can be provided. In this state, the continuous expansion of the air bag body 10 and the bank portions 10a, 10a maintains a protective state against the secondary accident.

DETAILED DESCRIPTION OF THE PREFERRED EMBODIMENTS

FIGS. 1 to 5 show a first embodiment (a first device).

Figure 1:
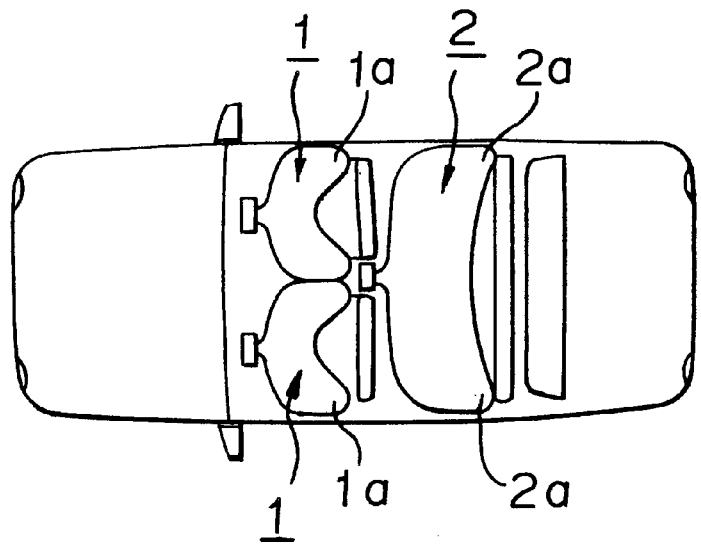
FIG. 1 is a plan view showing an inside of an automobile in which the an air bag according to the present invention is in an operative state.
Figure 2:
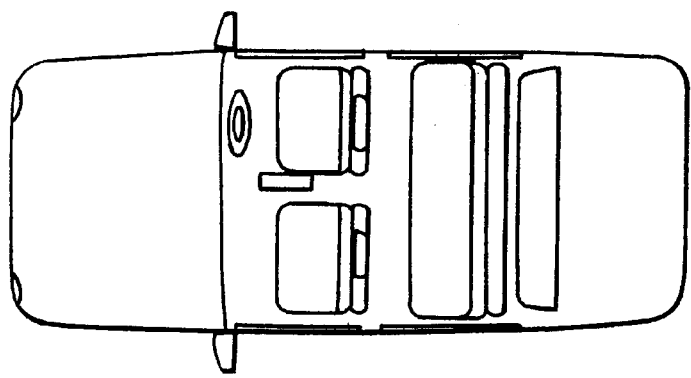
FIG. 2 is a plan view showing the inside of the automobile in which the air bag according to the present invention is in a pre-operative state.
Figure 3:
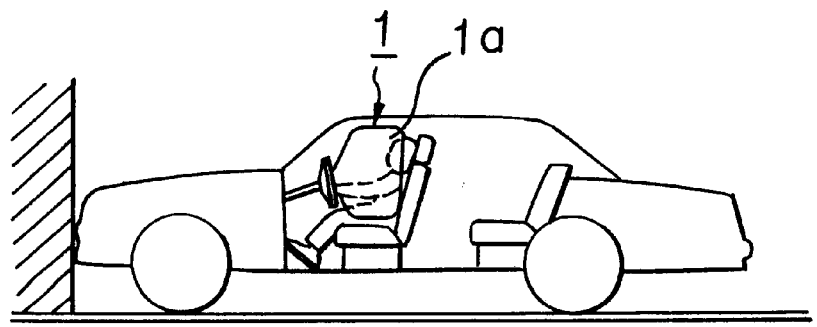
FIG. 3 is a cross sectional view showing the inside of the automobile in which the air bag according to the present invention is in the operative state.
Figure 4:
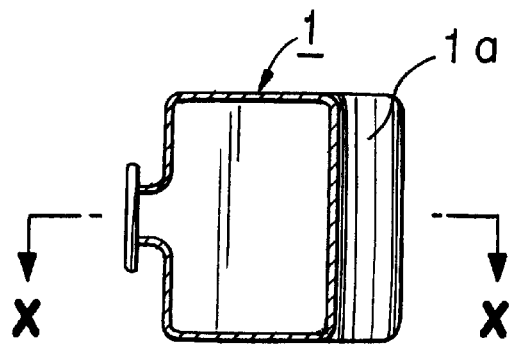
FIG. 4 is a longitudinal sectional view taken on a longitudinal center line of an air bag according to the present invention.
Figure 5:
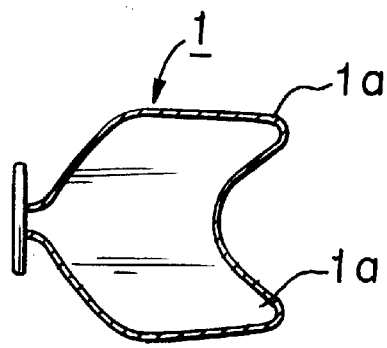
FIG. 5 is a cross sectional view taken on line X—X of FIG. 4.
Figure 6:
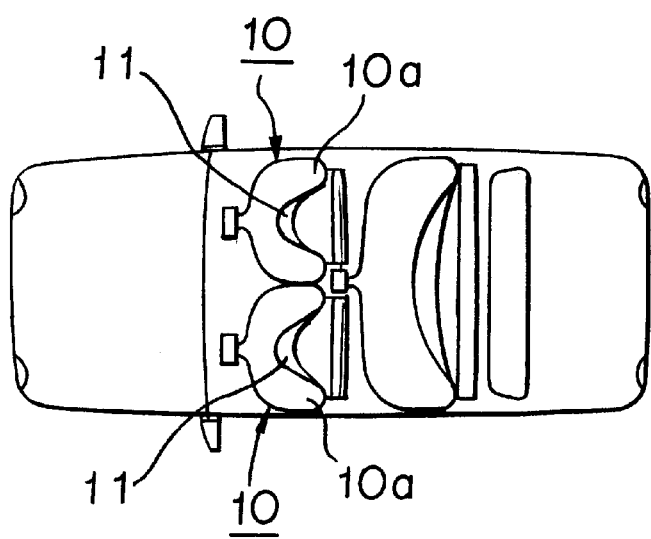
FIG. 6 shows a second embodiment of the present invention, and is a plan view of the inside of the automobile in which the embodiment is in the operative state.
Figure 7:
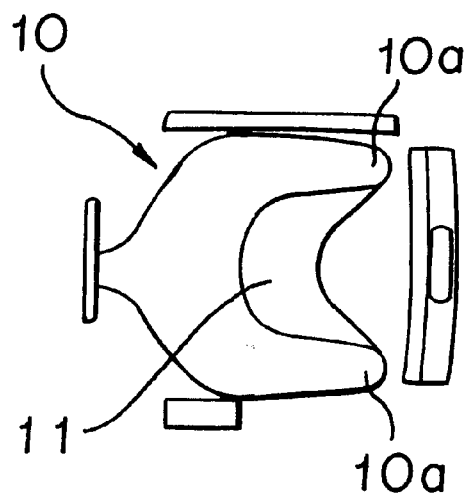
FIG. 7 is a plan view showing the second embodiment of the present invention.

FIG. 1 shows a state that an air bag is operated. The air bag is typically accommodated in a steering wheel, a dashboard and the like so that the air bag may be concealed with them as shown in FIG. 2. When the air bag detects an impact accompanied with an occurrence of an accident, and it rapidly expands as shown in FIG. 1. A basic functional construction of the air bag according to the present invention is the same as a conventional air bag system. Although, in the embodiment shown in FIG. 1, the air bag is disposed in all of a driver's seat, a passenger seat and a rear seat, the air bag may be partially disposed in, for example, the driver's seat alone or the driver's seat and the passenger seat.

In the air bag according to the present invention, as shown in FIG. 1 and FIGS. 3 to 5, a front side of an air bag body 1 is so constructed that its center is defined as a concavity and it is pushed forth toward both of its sides. Namely, bank portions 1a, 1a are formed at both the sides so that an entire upper half part of a human body, more specifically, a head may be wrapped forward and leftward-and-rightward.

The above-described air bag body is the same shape as the air bag body for the passenger seat. An air bag body 2 for the rear seat is so constructed that bank portions 2a, 2a are formed in the corresponding portions at both the right and left ends of the rear seat so as to generally protect a whole rear seat. However, similarly to the air bag bodies for the driver's seat and the passenger seat, as many air bag bodies for the rear seat as the number of persons who are seated at the rear seat may be individually disposed.

In the first embodiment described above, when the occurrence of the accident causes an expansion of the air bag body 2, the upper half part of the human body, more specifically, the head is protected so that it may be put between forward and backward and between leftward and rightward. Accordingly, a protective effect on a rightward-and-leftward impact as well as a frontal impact is achieved.

FIGS. 6 to 11 show a second embodiment (a second device). The second embodiment shown in these drawings is the generally same shape as the first embodiment described above. That is, an air bag body 10 for the driver's seat and the passenger seat is so constructed that bank portions 10a, 10a are formed at both the sides so as to wrap the upper half part of the human body, more specifically, the head with the bank portions 10a, 10a.

Figure 8:
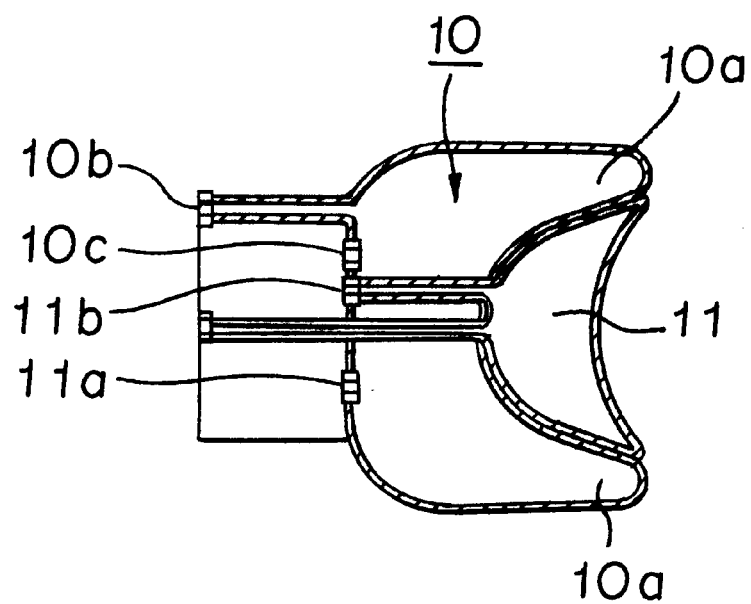
FIG. 8 is a transverse sectional view of the second embodiment of the present invention.

In the second embodiment, an auxiliary air bag 11 is additionally disposed between the bank portions 10a and 10a of the air bag body 10. As shown in FIG. 8, the air bag body 10 and the auxiliary air bag 11 are so constructed that their respective blowing ports and discharge ports for an expanding gas independently follow the individual routes. In FIG. 8, numeral 10b denotes a gas blowing port of the air bag body 10. Numeral 10c denotes a discharge port of the air bag body 10. Numeral 11a denotes a gas blowing port of the auxiliary air bag 11. Numeral 11b denotes a discharge port of the auxiliary air bag 11.

Figure 9:
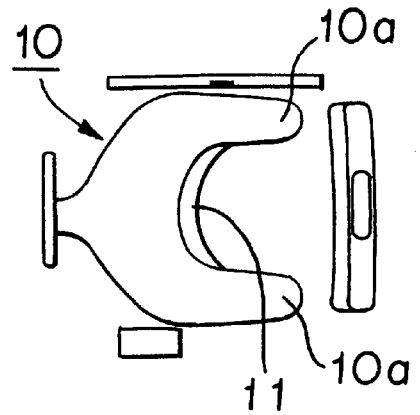
FIG. 9 is a plan view showing a state of a completion of a gas discharge from an auxiliary air bag 11 in the second embodiment of the present invention.
Figure 10:
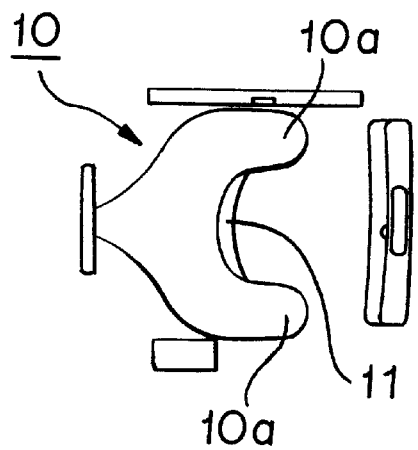
FIG. 10 is a plan view showing a state of a start of the gas discharge from an air bag body 10 in the second embodiment of the present invention.
Figure 11:
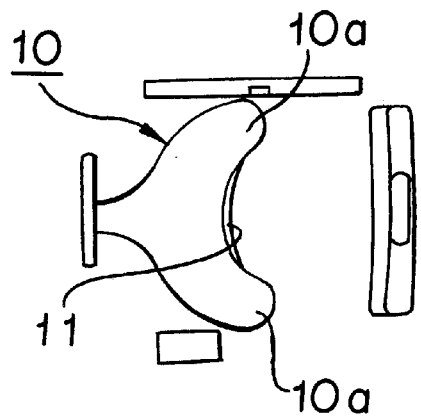
FIG. 11 is a plan view showing a completion of 60% of the gas discharge from the air bag body 10 in the second embodiment of the present invention.

In accordance with the above-described construction, the air bag body 10 and the auxiliary air bag 11 expand at the same time at the occurrence of the accident. In about three seconds after the accident, the gas in the auxiliary air bag 11 is completely degassed as shown in FIG. 9. In about seven seconds after the accident, about 40% of the gas in the air bag body 10 is degassed as shown in FIG. 10. In about fifteen seconds after the accident, about 60% of the gas in the air bag body 10 is degassed as shown in FIG. 11. In about thirty seconds after the accident, the gas in the air bag body 10 is completely degassed.

In the second embodiment of the present invention, the above-described construction is intended to protect the human body by the same expansion of the air bag body 10 and the auxiliary air bag 11 at the occurrence of the accident. The gas in the auxiliary air bag 11 is degassed for a short time after the accident, whereby the head of the human body is free to move.

However, in this case, the complete expansion of the air bag body 10 allows the head of the human body to be protected against the leftward-and-rightward impact. Accordingly, at the occurrence of a secondary accident in this state, for example, even if a primary accident causes an automobile to turn to a different direction thereby resulting in another collision with a utility pole or other automobile, the air bag body 10 achieves the protective effect on the impact. Since a movement of the head is free in this state, an appropriate treatment of the accident can be provided. That is, this operation permits an almost complete protection against, more specifically, a side impact.

In about thirty seconds after the accident, since the gas in the air bag body 10 is completely degassed, the protection of the human body is released. Accordingly, a driver and a passenger can get out of the automobile.

Finally, in the first embodiment, the frontal and either-side impact against the human body can be provided at the same time. At the occurrence of the secondary accident, the protection is provided as it is. In the second embodiment, after the occurrence of the primary accident, a pressure on the head, more specifically, a face is firstly released. Accordingly, an appropriate judgment and treatment can be provided for the secondary accident.

In the present invention according to claim 1, the automobile air bag is characterized by that the bank portions 1a, 1a are formed at both the sides of the air bag body 1 so that the head of the human body may be wrapped forward-and-backward and leftward-and-rightward. Accordingly, at the expansion of the air bag body 2 accompanied with the occurrence of the accident, the upper half part of the body, more specifically, the whole head is protected so that it may be put between forward and leftward-and-rightward. Therefore, the protective effect on the leftward-and-rightward impact as well as the frontal impact is achieved.

In the present invention according to claim 2, the automobile air bag is characterized by that the bank portions 10a, 10a are formed at both the sides of the air bag body 10 so that the head of the human body may be wrapped forward and leftward-and-rightward, the auxiliary air bag 11 is disposed between the bank portions 10a, 10a of the air bag body 10, both the air bags are so independently disposed that their respective blowing ports and discharge ports for the expanding gas follow the individual routes, whereby, after a completion of the gas discharge from the auxiliary air bag 11, the gas is discharged from the air bag body 10. Accordingly, the appropriate treatment can be provided for the secondary accident.

That is, at the occurrence of the primary accident, the expansion of the air bag body 10 and the auxiliary air bag 11 allows the upper half part of the human body, more specifically, the head to be protected from the leftward-and-rightward impact as well as the frontal impact. After the occurrence of the primary accident, the gas in the auxiliary air bag 11 is degassed prior to a degassing of the air bag body 10. Accordingly, the pressure on the face is released, and the head is movable. Therefore, a choking sensation which is caused by the pressure of the air bag 10 can be released. A movement of the head can provide the appropriate judgment and treatment for the secondary accident.

What is claimed is:

1. An automobile air bag, wherein bank portions are formed at both the sides of an air bag body so that a head of a human body may be wrapped forward and leftward-and-rightward, an auxiliary air bag is disposed between said bank portions of said air bag body at a point where the head is being protected against a frontal impact, each of said air bags having a respective blowing port for filling said air bags with a gas each of said air bags having a respective discharge port for degassing said air bags, the air bags are independently constructed such that their respective blowing ports and discharge ports for an expanding gas follow individual routes, whereby, after a completion of a gas discharge from said auxiliary bag, the gas is discharged from said air bag body.

* * * * *